United States Patent [19]

Tazuma et al.

[11] 4,108,944

[45] Aug. 22, 1978

[54] METAL SALTS OF MODIFIED ANHYDRIDE RESIN

[75] Inventors: James J. Tazuma, Stow; Mario D. Zadra, Barberton, both of Ohio

[73] Assignee: The Goodyear Tire & Rubber Company, Akron, Ohio

[21] Appl. No.: 835,615

[22] Filed: Sep. 22, 1977

Related U.S. Application Data

[62] Division of Ser. No. 699,910, Jun. 24, 1976, Pat. No. 4,071,669.

[51] Int. Cl.$^2$ .................................................. C08F 8/42
[52] U.S. Cl. ................................ 260/879; 260/878 R; 526/41; 526/47.7; 526/47.9; 526/48.2
[58] Field of Search ............... 260/879; 526/47.9, 48.2

[56] References Cited

U.S. PATENT DOCUMENTS

| | | | |
|---|---|---|---|
| 3,511,798 | 5/1970 | Isaacson | 526/48.2 |
| 3,929,737 | 12/1975 | Tazuma et al. | 260/879 |
| 3,943,111 | 3/1976 | Fritze et al. | 526/48.2 |
| 4,009,228 | 2/1977 | Tazuma et al. | 260/879 |
| 4,071,669 | 1/1978 | Tazuma et al. | 260/879 |

*Primary Examiner*—William F. Hamrock
*Attorney, Agent, or Firm*—H. C. Young, Jr.

[57] ABSTRACT

A metal salt of an anhydride modified resin prepared by reacting an aqueous medium (A) a water soluble metal salt and (B) the sodium or potassium salt of the acid of said anhydride modified resin or (C) the sodium or potassium salt of the half acid/half ester of said anhydride modified resin. Such metal salts may have utility as additives for constituents in pressure sensitive adhesives and as tackifying agents.

8 Claims, No Drawings

METAL SALTS OF MODIFIED ANHYDRIDE RESIN

This is a division of application Ser. No. 699,910 filed June 24, 1976, U.S. Pat. No. 4,071,669.

This invention relates to metal salts of resinous compositions and to their preparation. This invention particularly relates to preparation of metals salts of resin acid or of resin half acid/half ester of a maleic anhydride modified basic hydrocarbon resin having a backbone of piperylene and selected branched monoolefins.

Hydrocarbon resins having a backbone of piperylene and selected branched monoolefins such as 2-methyl-2-butene have found substantial utility as tackifiers for rubber, pressure sensitive adhesives and hot melt adhesives.

For example, a unique resin, characterized by having a softening point in the range of about 10° C, to a about 30° C. having a backbone derived from piperylene and 2-methyl-2-butene can be prepared by polymerizing the monomers with boron trifluoride. Such relatively low softening point resins derived from piperylene and selected branch chain monoolefins have been found to have unique utilities in the field of tackifying resins for rubbery materials and particularly in the field of relatively sophisticated pressure sensitive adhesives.

Modifications of such a low softening point resin with maleic anhydride has provided a modified resin with further enhanced utility as a tackifier as capable of being able to be incorporated directly into a rubbery polymer (U.S. Pat. No. 3,929,737).

It has now been found that further modification of the maleic anhydride modified resin can produce products of further and additional enhanced properties and utilities in the field of tackifying thickening and dispersing agents in pressure sensitive adhesives.

Conversion of the anhydride-modified resin to a metal salt by first forming the resin acid itself was found to be impractical because of a formation of a two phase system, thereby inhibiting an intimate reaction.

Therefore, it is an object of this invention to provide a metal salt of a maleic anhydride-modified resin of piperylene and selected branched olefin.

In accordance with this invention, a metal salt of an anhydride-modified resinous material is provided which is prepared by the method which comprises reacting in an aqueous medium (A) about 0.4 to about one equivalent of a water soluble salt selected from chlorides, nitrates and sulfates of metals selected from calcium, zinc, aluminum, lead and cobalt and one equivalent of (B) the sodium or potassium salt of the acid of said anhydride-modified resin or (C) the sodium or potassium salt of the half acid/half ester of said anhydride-modified resin; where said resin acid salt is prepared by heating a mixture of an aqueous solution of a hydroxide selected from at least one of sodium hydroxide and potassium hydroxide and said anhydride-modified resin; where said half acid/half ester salt is prepared by (1) reacting a mixture of said anhydride-modified resin with an alcohol selected from methanol, ethanol, isopropanol, n-butanol and isooctyl alcohol until the acid number of said modified reduced about 40 to about 60 percent and (2) reacting the product thereof as a mixture in an aqueous solution of about 75 to about 110 stoichiometric percent of a hydroxide selected from at least one of sodium hydroxide and potassium hydroxide; where said anhydride-modified resin is comprised of about 45 to about 55 mole percent units derived from maleic anhydride and, correspondingly, about 55 to about 45 mole percent units derived from a piperylene/methyl branched monoolefin backboned resin comprising about 40 to about 70 weight percent units derived from piperylene and correspondingly about 60 to about 30 weight percent units derived from at least one methyl branched chain α or β monoolefin containing 4 to 6 carbon atoms, where the weight ratio of piperylene to said branched monoolefin is in the range of about 0.8/1 to about 2/1.

In the practice of this invention, it is preferred that a sodium or potassium, preferably sodium, salt of the anhydride-modified resin is first prepared in an aqueous medium which is, in turn, then reacted with the water soluble metal salt. Representative of the various suitable water soluble metal salts are calcium chloride, zinc chloride, aluminum sulfate, lead nitrate and cobaltous chloride. Cobalt chloride and zinc chloride are especially useful.

The metal salt of the acid of said anhydride-modified resin is conveniently prepared by first mixing the anhydride-modified resin with a solution of sodium hydroxide or potassium hydroxide, preferably sodium hydroxide, and heating the mixture. Although the amount of water is not critical, generally about 5 to about 10 parts by weight water is used per part of modified resin. The mixture can conveniently be heated to from about 70° to about 90° C. temperature for a period of about 1 to about 3 hours. The resulting mixture is typically milky in appearance indicating a self-emulsification of the sodium or potassium salt of the modified resin acid. To the mixture is then added, preferably in aqueous solution form, the metal salt. The metal salt/water solution can be added somewhat slowly, such as over a period of about 3 to about 30 minutes interval of time, if desired, while maintaining the mixture itself at a temperature in the range of about 70° C. to about 90° C. and preferably while stirring. The mixture is then cooled to room temperature or about 10° to about 30° C. and precipitated solids recovered by conventional means, such as by filtering, water-washing and drying.

The metal salt of the modified resin half acid/half ester is conveniently prepared by first reacting the anhydride-modified resin with an alcohol. Generally, at least about one equivalent of alcohol is used per equivalent of anhydride-modified resin or, in other words, at least about a stoichiometric amount. Actually, more alcohol can be used, if desired, although it is generally an excess. Indeed, for the more volatile alcohols, more than one equivalent can be used so that its excess can serve as a solvent in the reaction. The mixture is generally heated to a temperature in the range of about 30° to about 250° C. for a short period of time, such as about 10 to about 30 minutes. To the mixture is then added, preferably slowly, sodium hydroxide or potassium hydroxide, preferably sodium hydroxide, either as an alcohol solution or a water solution. The mixture is then heated to a temperature of about 80° C. to reflux over a period of about 30 minutes to about 2 hours, with stirring. To the mixture is then slowly added a water solution of the water soluble metal salt while the mixture is heated at a temperature in the range of about 80° C. to about reflux with stirring over a period of about 1 to about 3 hours. A small amount of solution aid can also be added, if desired, with the metal salt solution such as additional alcohol or a chlorinated solvent such as chloroform, trichloroethylene and carbon tetrachloride.

The metal salt of the half acid/half ester of modified resin can then be recovered by conventional means, such as by filtration and/or by solvent extraction.

In the practice of this invention, said anhydride modified resin is prepared by the method which comprises the steps of (1) reacting about 30 to about 60 parts by weight maleic anhydride or reacting about 10 to about 25 parts by weight maleic anhydride if an organo peroxide catalyst is used at a temperature in the range of about 150° to about 250° C. with 100 parts by weight of a basic hydrocarbon-derived resin having a softening point in the range of about 10° to about 50° C. prepared by polymerizing in the presence of a catalyst selected from boron trifluoride and boron trifluoride etherate, a monomer mixture which comprises about 40 to about 70 weight percent piperylene, and correspondingly, about 60 to about 30 weight percent of at least one monoolefin selected from methyl branched chain $\alpha$ or $\beta$ monoolefins containing 4 to 6 carbon atoms, where the weight ratio of piperylene to said branched chain monoolefin is about 0.8/1 to about 2.3/1 and (2) removing unreacted maleic anhydride, if any, preferably by distillation.

Various methyl branched chain monoolefins having $\alpha$ or $\beta$ double bonds can be used for preparing the basic hydrocarbon-derived resin. Representative of such monoolefins are isobutylene, 2-methyl-1-butene, 2-methyl-2-butene, 2-methyl-1-pentene and 2-methyl-2-pentene. The five carbon atom-containing 2-methyl-1-butene and 2-methyl-2-butene are generally preferred, with 2-methyl-2-butene being especially desirable.

Thus, this invention requires an anhydride-modified resin starting material having a basic resin backbone of piperylene/methyl branched chain monoolefin which has been modified with maleic anhydride. The amount of maleic anhydride typically required in preparing the anhydride-modified resin is substantially reduced by the use of a free radical initiator such as organoperoxides.

The maleic anhydride modification of the basic hydrocarbon-derived resin backbone is preferably facilitated by reacting maleic anhydride with the basic resin to an extend sufficient to achieve a resinous product having an acid-number of about 175 to about 350 after excess maleic anhydride removal. Therefore, this acid number range is an important measure, test or indicator of the required extent of maleic anhydride modification.

The anhydride modification of the basic resin backbone can be conducted at a temperature in the range of about 150° to about 250° C. If a solvent or dilent is used, the temperature of the reaction can be controlled by the boiling point of the solvent selected or carried out in a high pressure vessel. A generally preferred temperature range is about 180° to about 200° C. Typically, the anhydride reaction can take about 3 to about 6 hours. The reaction can be conducted at atmospheric pressure or above atmospheric pressure. Also, the reaction can be conducted as a batch process or on a continuous basis. At the conclusion of the reaction, it is generally desired and typically required to remove any excess maleic anhydride usually by distillation, particularly vacuum distillation, or distillation under a reduced pressure, such as from about 5 to about 500, preferably about 10 to about 100 millimeters mercury at a temperature in the range of about 120° to about 140° C.

It is generally desired that the anhydride reaction be conducted substantially free of organic solvents or diluents. If a solvent is desired, generally up to about 50 weight percent solvent can be used, although preferably a maximum of about 20 weight percent is allowed based on the total medium or mixture consisting of solvent, maleic anhydride and hydrocarbon-derived resin. Representative of various organic solvents are o-dichlorobenzene, decalin, tetralin, diisopropyl benzene, and aromatic solvents boiling in the range of about 150° to about 200° C.

A free radical initiator can be used for the anhydride reaction if desired. If such an initiator is used, usually about 5 to about 15 mole percent is used, based on the said maleic anhydride. Representative of the many various well known free radical initiators are organoperoxides, such as di-t-butyl peroxide, di-t-amyl peroxide, t-butyl cumyl peroxide and dicumyl peroxide. Usually, the free radical initiator is added slowly, or incrementally, to the reaction mixture over a period of time, such as about 5 to 180 minutes, in order to maintain control of the reaction. In addition, when an initiator is employed, the maleic anhydride to the basic resin backbone weight ratio is typically lowered to about 0.1:1 to about 0.25:1.

The basic hydrocarbon-derived resin for the anhydride modification is characterized by a relatively low softening point in the range of about 10° to about 50° C., particularly and preferably about 10° to about 40° C., and is the product of polymerizing in the presence of boron trifluoride or boron trifluoride etherate, a mixture which comprises about 40 to about 70 weight percent piperylene, and, correspondingly, about 60 to about 30 weight percent of a branched monoolefin selected from methyl branched tertiary $\alpha$ and $\beta$ olefins having from 4 to 6 carbon atoms. It is preferred that the monomer mixture to be polymerized comprises from about 45 to about 65 weight percent piperylene and, correspondingly, about 55 to about 35 weight percent of said methyl branched tertiary monoolefin. Preferably said monoolefin is a methyl branched $\alpha$-olefin containing 5 to 6 carbon atoms. Even more preferably, it is 2-methyl-1-butene or 2-methyl-2-butene.

The basic resin, in addition to its characterized low softening point, may be further characterized by having a viscosity in the range of about 400 to about 1,000,000 and preferably about 1,000 to about 100,000 centipoises (cps) at about 25° C. depending somewhat upon the degree of stripping of the resin product to remove light oil-like products and unreacted hydrocarbons. This reference to degree of stripping is not intended to be misleading or ambiguous. Typically, the major portion of the polymerization product is the resin for this invention whereas only a minor portion consists of oil-like products. Reference is made to the degree of stripping only because of the sensitivity of viscosity to very small amounts of low viscosity oil-like products and unreacted hydrocarbons. It is thus desired to strip the product to remove at least about 95 weight percent of such materials. In practice, about 50 to about 85, preferably about 60 to about 80, weight percent of the piperylene/branched olefin mixture is typically converted to the resin.

The characteristic softening point of the maleic anhydride modified basic resin backbone product and of the basic resin itself can be determined by ASTM Method E 28-58T. The softening point determined thereby is sometimes called the Ring and Ball softening point and is an important characteristic of the interplay between structure and composition of the resin.

The polymerization reaction for the basic resin is conveniently carried out in the presence of a diluent because it is usually exothermic. Various diluents which are inert in that they do not enter into the polymerization reaction can be used. Representative examples of inert diluents are aliphatic hydrocarbons such as pentane, hexane and heptane and aromatic hydrocarbons such as toluene and benzene. Unreacted hydrocarbons from the reaction mixture itself can be a diluent. The aliphatic and unreacted hydrocarbons are preferred.

A wide range of temperatures can be used for the polymerization reaction for the preparation of the basic resin such as about −50° to about 50° C. and preferably in the range of about 0° to about 30° C. The reaction can be carried out at atmospheric or above or below atmospheric pressure. Typically, a satisfactory polymerization can be conducted at atmospheric pressure or at about autogenous pressure developed by the reactants under the operating conditions used. The time of reaction is not particularly or primary importance and can vary from a few minutes to 12 hours or more.

The basic resin backbone polymerizate is typically distilled, by steam distilling for example, to remove light oil-like products, unreacted hydrocarbons and solvent, if used, to yield the product resin.

In the practice of this invention, the catalyst for preparing the basic resin backbone is required to be selected from boron trifluoride and a boron trifluoride etherate. The boron trifluoride etherate catalyst used to prepare the resin is a complex of the type derived from boron trifluoride and an ether having from 2 to about 12, and preferably from 2 to about 6, carbon atoms. The complex is generally represented by the formula:

$BF_3 \cdot OR_2$

Representative of various ethers for preparation of the etherate are those having the structure ROR', where R and R' are individually selected from saturated alkyl radicals having from 1 to about 6, and preferably about 1 to about 3, carbon atoms, such as methyl, ethyl, n-propyl, isopropyl, n-butyl, isobutyl, sec-butyl, t-butyl, n-pentyl, isopentyl, 5-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° to about 25° C., and usually in the range of about 10° to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl 2-ethyl hexyl ether. Diethyl ether is usually preferred.

The metal salts of resin acid (Ca, Zn and Al) can have utility as constituents in pressure sensitive adhesives, when combined with rubber, as thickening agents, dispersing agents for pigments, and as tackifying agents. The cobaltous chloride salt of resin acid can have utility as a vulcanizing agent in high sulfur natural rubber stock and may give rise to high state of cure.

The metal (Ca, Zn, Al) salts of half acid/half ester resin can have utility as materials in printing inks.

The following examples further illustrate the invention and are not intended to be limiting. In these examples, the parts and percentages are by weight unless otherwise indicated.

EXAMPLE I

To a reactor equipped with a condenser, stirrer and thermometer was charged 450 parts of a basic resin prepared from piperylene and 2-methyl-2-butene and 294 parts maleic anhydride. The mixture was heated to 190° C. The reaction was allowed to proceed for 5 hours and then cooled to about 100° to about 125° C. at which time the unreacted maleic anhydride was flash distilled under a reduced pressure to final condition of about 130° to about 135° C. at about eight to 10 milliliters mercury. The remaining hot composition was poured into an aluminum dish and allowed to cool. The product was analyzed according to ASTM Method E28-58T to have a softening point of 78° C. The product was further analyzed by Goodyear Method AR 505 with sodium hydroxide and determined to have an acid number of about 220 for the hydrolyzed anhydride.

In this example, the piperylene/2-methyl-2-butene resin had been prepared by polymerizing a monomer mixture comprising about 65 parts by weight piperylene and, correspondingly, about 35 parts by weight 2-methyl-2-butene with boron trifluoride. This resulting resin had a softening point of about 20° C.

EXAMPLE II

Preparation of Resin Acid Soap

To a reactor equipped with condenser, thermometer, mechanical stirrer and dropping funnel was charged one equivalent weight of an anhydride modified piperylene/2-methyl-2-butene backbone resin having an acid number of about 240 prepared according to the method of Example I. The 1 gram equivalent weight was calculated as 234 grams (gm) as 56,100/240. To the reactor was then charged one gm equivalent of KOH (561 gm) in 1640 cubic centimeters (cm³) of water. The mixture was warmed to about 80° to 85° C. The resultant mixture had a milky soap appearance, indicating a self-emulsification effect.

EXAMPLE III

Metal Acid Salt Preparation

To a reactor flask equipped with a stirrer, condenser, thermometer and dropping funnel was added about one gram equivalent of resin acid soap prepared according to the method of Example II. The soap was heated to 80° to 85° C. with stirring and about 1 gram equivalent amount of ZnCl₂ in 150 cm³ water was slowly added over about a 15 to 20 minute interval. After stirring an additional 2 hours at 80° to 90° C. the mixture was cooled to room temperature and the precipitated solids filtered, washed and dried in air. In a similar manner, calcium, aluminum, manganese, cobalt and lead salts were prepared utilizing calcium chloride, aluminum sulfate, manganese chloride, cobaltous chloride and lead nitrate, respectively.

EXAMPLE IV

Metal Half Ester Half Acid Salt Preparation

To a reactor as in (1) was added one equivalent of maleic anhydride-modified piperylene/2-methyl-2-butene resin and one equivalent of methanol. The mixture was refluxed with stirring for 9 hours and the resultant product was one-half equivalent of half acid methyl ester of resin acid. One-half equivalent of potassium hydroxide dissolved in methanol was added in about 15 minutes and, after refluxing about one hour with stirring, one-half equivalent amount of cobaltous chloride dissolved in 150 cm³ water was added simultaneously with 750 cm³ chloroform in about 20 minutes. After refluxing an additional 2 hours with stirring, the heat and stirrer were removed and the mixture was allowed to separate into two layers. The bottom layer contained chloroform and the metal salt, and the top layer was the alcohol-water mixture. The top layer was decanted and diluted two-fold with water and additional organic material recovered. The organic materials were combined and concentrated on a rotary evaporator to a final condition of 60° C. and 1 millimeter mercury reduced pressure for several hours. The solids were further dried in a vacuum oven at 30° C. and 1 millimeter reduced pressure to constant weight.

Table 1

| Salt | % Metal by Wt Theory | % Metal by Wt Found | Melting Point |
|---|---|---|---|
| Cobalt (aqueous) | 10 | 8.1 | didn't melt at 300° C. |
| Cobalt ester | 7.3 | 6.1 | 200–214° C. |
| Zinc | 11.1 | 8.7 | did not melt at 300° C. |
| Lead | 29.3 | 29.6 | did not melt at 300° C. |
| Aluminum | 7.5 | — | did not melt at 300° C. |
| Calcium | 8.3 | — | did not melt at 300° C. |

EXAMPLE V

To a reactor flask equipped with a stirrer, condenser, thermometer and dropping funnel was added about one equivalent of resin acid soap prepared according to the method of Example II. The soap was heated to 80° to 85° C. with stirring and about one-half equivalent amount of cobalt chloride in water added over a period of 20 minutes. After stirring an additional 1 hour, one-half equivalent of HCl in water added slowly and the precipitated solids filtered, washed and dried in air.

In the practice of this invention, for the preparation of the sodium or potassium salt of the half acid/half ester of said anhydride-modified resin, it is desired that it be produced by reacting said anhydride-modified resin with the monomer alcohols. Such reaction is conducted until sufficient amount of the acid groups are converted to the ester (namely, about 40 to about 60 percent) that the acid number of the resin is reduced about 40 to about 60 percent.

Additionally, it should be pointed out that, in the preparation of half acid/half ester salt, the product of the anhydride-modified resin/alcohol reaction is reacted in an aqueous solution of near stoichiometric amount of sodium or potassium hydroxide in order to prevent an excess of the hydroxide being present in the final product. Thus, if the reaction equation of reacting sodium or potassium hydroxide with the maleic modified resin/alcohol product shows that one mole of the hydroxide would normally be needed, then about 0.75 to about 1.1, preferably about 0.8 to 1.02, moles of hydroxide would be used.

While certain representative embodiments and details have been shown for the purpose of illustrating the invention, it will be apparent to those skilled in this art that various changes and modifications may be made therein without departing from the spirit or scope of the invention.

What is claimed is:

1. A metal salt of an anhydride-modified resin prepared by the method which comprises reacting in an aqueous medium (A) about 0.4 to about one equivalent of a water soluble salt selected from chlorides and nitrates of metals selected from zinc, aluminum, lead and cobalt and one equivalent of (B) the sodium or potassium salt of the acid of said anhydride modified resin, where said resin acid salt is prepared by reacting an aqueous solution of a hydroxide selected from at least one of sodium hydroxide and potassium hydroxide with said anhydride-modified resin where said anhydride-modified resin is comprised of about 45 to about 55 mole percent units derived from maleic anhydride and, correspondingly, about 55 to about 45 mole percent units derived from a piperylene/methyl branched monoolefin backboned resin comprising about 40 to about 70 weight percent units derived from piperylene and correspondingly about 60 to about 30 weight percent units derived from at least one methyl branched chain α or β monoolefin containing 4 to 6 carbon atoms, where the weight ratio of piperylene to said branched monoolefin is in the range of about 0.8/1 to about 2/1, where said anhydride modified resin is prepared by the method which comprises the steps of (1) reacting about 30 to about 60 parts by weight maleic anhydride or reacting about 10 to about 25 parts by weight maleic anhydride if an organo peroxide cataltst is used at a temperature in the range of about 150° to about 250° C with 100 parts by weight of a basic hydrocarbon-derived resin having a softening point in the range of about 10° to about 50° C. prepared by polymerizing in the presence of a catalyst selected from boron trifluoride etherate, a monomer mixture which comprises about 40 to about 70 weight present piperylene, and correspondingly, about 60 to about 30 weight percent of at least one monoolefin selected from methyl branched chain α or β monoolifins containing 4 to 6 carbon atoms, where the weight ratio of piperlene to said branched chain monoolefin is about 0.8/1 to about 2.0/1 and (2) removing unreacted maleic anhydride, if any, preferably by distillation.

2. The metal salt of claim 1 wherein a sodium salt of the anhydride-modified resin is first prepared in an aqueous medium which is, in turn, then reacted with the water soluble metal salt.

3. The metal salt of claim 1 where said water soluble salt is selected from zinc chloride, lead nitrate and cobaltous chloride.

4. The metal salt of claim 1 where said hydrocarbon-derived resin has a softening point in the range of about 10° to about 50° C. and is comprised of (A) piperylene and (B) a monoolefin selected from isobutylene, 2-methyl-1-butene, 2-methyl-2-butene, 2-methyl-1-pentene and 2-methyl-2-pentene.

5. The metal salt of claim 1 where said monoolefin for said hydrocarbon-derived resin is essentially 2-methyl-2-butene.

6. The metal salt of claim 1 prepared by the method which comprises (A) first mixing the anhydride-modified resin with an aqueous solution of sodium hydroxide and heating the mixture to a temperature in the range of about 70° to about 90° C., (B) adding the water soluble metal salt in an aqueous solution to the product and mixture of (A), (C) cooling the resulting mixture and product to a temperature in the range of about 10° to about 30° C. and (D) recovering the precipitated solid product.

7. The metal salt of claim 1 where the product of reacting the anhydride modified resin with the alcohol is reacted with an aqueous solution of about 80 to about 102 stoichiometric percent of the sodium hydroxide.

8. The metal salt of claim 1 where the acid number of the maleic anhydride modified resin is in the range of about 175 to about 350 and where said water soluble salt is selected from cobaltous chloride and zinc chloride.

* * * * *